United States Patent [19]
Strodtbeck et al.

[11] Patent Number: 5,864,547
[45] Date of Patent: Jan. 26, 1999

[54] METHOD AND SYSTEM FOR CONTROLLING UPLINK POWER IN A HIGH DATA RATE SATELLITE COMMUNICATION SYSTEM EMPLOYING ON-BOARD DEMODULATION AND REMODULATION

[75] Inventors: Andrew L. Strodtbeck, El Segundo; Jennifer L. Vollbrecht, Hermosa Beach, both of Calif.

[73] Assignee: Hughes Electronics Corporation, Los Angeles, Calif.

[21] Appl. No.: 700,961

[22] Filed: Aug. 21, 1996

[51] Int. Cl.[6] .................................................. H04B 17/02
[52] U.S. Cl. .......................... 370/318; 370/527; 455/13.4; 455/69
[58] Field of Search .................................... 370/509, 316, 370/318, 252; 455/13.4

[56] References Cited

U.S. PATENT DOCUMENTS

| | | | |
|---|---|---|---|
| 4,261,054 | 4/1981 | Scharla-Nielson | 455/13.4 |
| 4,697,187 | 9/1987 | Ohno et al. | 342/358 |
| 5,473,601 | 12/1995 | Rosen et al. | |
| 5,485,464 | 1/1996 | Strodtbeck et al. | |
| 5,623,486 | 4/1997 | Dohi et al. | 370/342 |

OTHER PUBLICATIONS

Patent application Ser. No. 08/142,524, Filed Oct. 21, 1993, entitled "High Data Rate Satellite Communication System", Inventor Harold A. Rosen et al. Attorney Docket No. PD–93448.

Pursley, M., Adaptive Transmission for Frequency Hop Communication with Reed–Solomon Coding, pp. 866–869, 1997.

*Primary Examiner*—Chi H. Pham
*Assistant Examiner*—W. Todd Baker
*Attorney, Agent, or Firm*—Elizabeth E. Leitereg; Terje Gudmestad; Michael W. Sales

[57] ABSTRACT

A method and system for controlling uplink power for signal transmission in a satellite communication system employing on-board demodulation and remodulation and having a plurality of user terminals that are linked by and that communicate with each other by way of a satellite relay system. A downlink error rate of the data in a downlink data stream is determined based on known data bits. An end-to-end error rate of the uplink data stream and the downlink data stream is determined. An error rate of the signal transmission is then determined based on the downlink error rate and the end-to-end error rate. The signal transmission is then controlled based on the error rate of the signal transmission.

12 Claims, 5 Drawing Sheets

METHOD AND SYSTEM FOR CONTROLLING UPLINK POWER IN A HIGH DATA RATE SATELLITE COMMUNICATION SYSTEM EMPLOYING ON-BOARD DEMODULATION AND REMODULATION

TECHNICAL FIELD

This invention relates generally to satellite communication systems, and more particularly, to a method and system for controlling uplink power in a high data rate satellite communication system that employs on-board demodulation and remodulation.

BACKGROUND ART

The past several decades have seen the development of communications systems that provide for the real-time distribution of information on a global scale. The development of such global communication systems has evolved along several paths that use either ground-based or satellite-based communication. Satellite-based systems have been employed for many years to distribute voice, data and video signals for global broadcasting of news and sporting events, for example. With the advent of newer high power satellite systems and technology, direct broadcast television systems are available that provide for broadcasting of television signals from up to 100 stations using a single satellite. Individuals install an antenna and a satellite receiver that receives the broadcasts directly by way of the satellite and display them on a television monitor.

In order to provide for more personal communication or teleconferencing between individuals, companies such as AT&T, for example, have developed a video telephone system that employs a small (3–4 inch) television monitor in combination with a conventional telephone. The video telephone system typically uses fiber optic links to provide a sufficient bandwidth to carry the video along with the voice signals. However, this type of system does not have enough bandwidth to provide for full motion video.

In order to provide a more cost-effective solution than terestial communication alternatives for low duty cycle, wide bandwidth applications, such as personal video, the assignee of the present invention has developed a high data rate satellite communication system that provides for the communication and distribution of full motion video, voice, and data signals, to provide for a wide array of data communications including personal teleconferencing between individuals. This system is disclosed in U.S. patent application Ser. No. 08/142,524, filed Oct. 21, 1993, entitled "High Data Rate Satellite Communication System", the contents of which are incorporated herein by reference. This high data rate satellite communication system comprises a plurality of very small user terminals (VSAT's) that are linked by and that communicate with each other by way of a satellite relay system. A network control center provides control signals that control the satellite relay system and coordinate linking of terminals to each other. The system employs frequency division multiplexing on uplinks from the terminals and the network control center to the satellite relay system. The system employs time division multiplexing on downlinks from the satellite relay system to the terminals and the network control center.

To provide for efficient bandwidth utilization in this high data rate satellite communication system and to increase the number of users that may be supported by the system, the assignee of the present invention has developed a new frequency reuse technique and data coding structure. This system is disclosed in U.S. Pat. No. 5,473,601, issued Dec. 5, 1995, entitled "Frequency Reuse Technique For A High Data Rate Satellite Communication System", the contents of which are incorporated herein by reference.

However, communication systems utilizing Kaband frequencies and multi-beam payloads with on-board demodulation and routing to achieve acceptable throughputs to low cost, very small user terminals must tolerate sizable variations in atmospheric attenuation due to rain and other climatic effects. For example, if there is rain fade on the downlink only, the receiving ground station would detect poor performance. In the current art, as applied to transponded (i.e., non-demodulation/remodulation) systems, the receiving ground station would then transmit feedback to the transmitting ground station identifying a need for increased power. The ground stations receiving the adjacent channels detect poor performance and request an increase in power of their corresponding transmit ground stations. For a transponded system, this increase in uplink power translates to an increase in downlink signal-to-noise ratio. However, in a system which utilizes on-board demodulation and remodulation and a plurality of simultaneously uplinking user terminals, an increase in uplink power causes interference with adjacent uplink channels causing adjacent channel degradation. Application of the current art to such a system would cause all uplinks to migrate toward maximum power and, thus, system runaway occurs. Thus, a modification in the current art of uplink power control is needed to handle systems with on-board demodulation and remodulation and a plurality of simultaneously uplinking users.

An alternative to the current art which might be used on non-demodulation and remodulation systems is to simply oversize the uplink powers. However, for a multi-user system this would cause increased uplink interference. In addition to increased uplink interference, oversizing the uplink power to accommodate rain fades increases signal power imbalances seen at the satellite demodulator. Signal level imbalance affects the necessary complexity of the on-board processor in terms of filter selectivity, A/D converter size, and computational precision. This increased complexity also increases the power required by the on-board processor.

Thus, there exists a need to control the uplink power so as to minimize the interference with other communication links within the system. There also exists a need to control the uplink power without adding complexity to the satellite.

DISCLOSURE OF THE INVENTION

It is a general object of the present invention to provide a method and system for controlling the uplink power in a high data rate satellite communication system that employs on-board demodulation and remodulation and a plurality of simultaneous uplink users.

It is another object of the present invention to provide a method and system for controlling the uplink power in a high data rate satellite communication system without adding complexity to the satellite.

In carrying out the above objects and other objects, features, and advantages of the present invention, a method is provided for controlling the uplink power in a high data rate satellite communication system utilizing on-board demodulation and remodulation and a plurality of simultaneous uplink users. The method includes the step of determining a downlink error rate of the downlink data stream. The method also includes the step of determining an endto-end error rate of the uplink data stream and the downlink data stream. Still further, the method includes the step of determining an error rate of the uplink based on the downlink error rate and the end-to-end error rate. Finally, the method includes the step of controlling the power of the uplink based on the error rate of the uplink.

In further carrying out the above objects and other objects, features, and advantages of the present invention, a system is also provided for carrying out the steps of the above described method. The system includes means for determining a downlink error rate of the downlink data stream. The system also includes means for determining an end-to-end error rate of the uplink data stream and the downlink data stream. Still further, the system includes means for determining an error rate of the uplink based on the downlink error rate and the end-to-end error rate. Finally, the system includes a controller for controlling the power of the uplink based on the error rate of the uplink.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
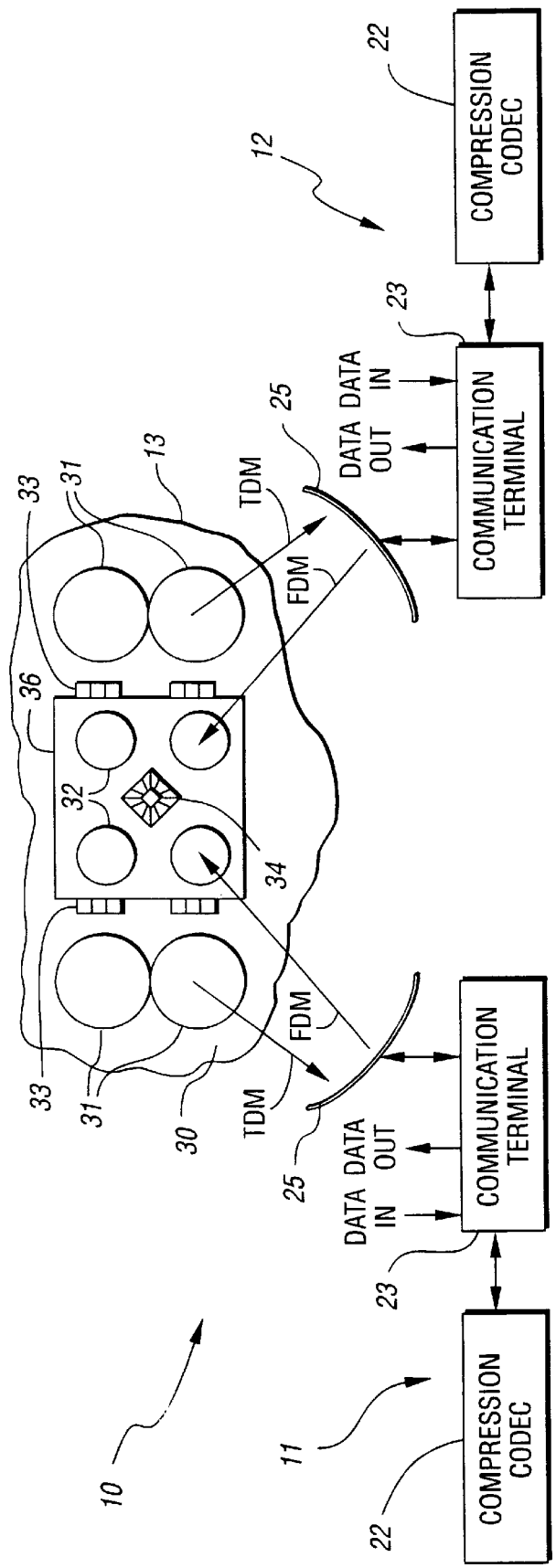
FIG. 1 illustrates a high data rate satellite communication system in which the present invention may be employed.

Referring to the drawing figures, FIG. 1 illustrates a high data rate satellite communication system 10 in which the present invention may be employed. The system 10 comprises a plurality of user terminals (VSAT's) 11,12 (corresponding to first and second user terminals 11,12) that are linked by and that communicate with each other by way of a satellite relay system 13. The system 10 employs frequency division multiplexing on uplinks from the terminals 11,12 and the network control center 14 to the satellite relay system 13. The system 10 employs time division multiplexing on downlinks from the satellite relay system 10 to the terminals 11,12 and the network control center 14.

Each user terminal 11,12 comprises a data compression coder/decoder (CODEC) circuit 22 for compressing and coding input data and decompressing and decoding output data, a transceiver 23 for modulating and demodulating input and output data, and an antenna 25 for transmitting and receiving encoded data to and from the satellite relay system 13. In the alternative, and in the case of data communication (as opposed to video), the compression circuit 22 is replaced by interface circuitry that interfaces to a data source, such as a local area network, a terminal or computer, a data communication line, or the like.

The satellite relay system 13 is typically comprised of a satellite 30, a plurality of receive antennas 32, a plurality of transmit antennas 31, and a signal processor 36. Respective pluralities of feed horns 33,34 are provided to feed data to and from the respective transmit and receive antennas 31,32.

The plurality of receive antennas 32 operate in a first frequency band and produce a first plurality of beams that cover a predefined area. The plurality of receive antennas 32 receive frequency division multiplexed data from the first user terminals 11 on a first beam. The plurality of transmit antennas 31 operate in a second frequency band and produce a second plurality of beams that cover the predefined area. The plurality of transmit antennas 31 transmit the time division multiplexed data to the second user terminal 12 on a second beam. It is to be understood that the second beam may be geographically colocated with the first beam, depending upon the respective locations of the source and destination user terminals 11,12.

The signal processor 36 demodulates frequency division multiplexed data received on the first beam from the first user terminal 11, routes the demodulated data so that it is transmitted on the second beam to the second user terminal 12, remodulates the demodulated data to provide encoded data comprising time division multiplexed data, and transmits the frequency division multiplexed data on the second beam to the second user terminal 12.

Figure 2:
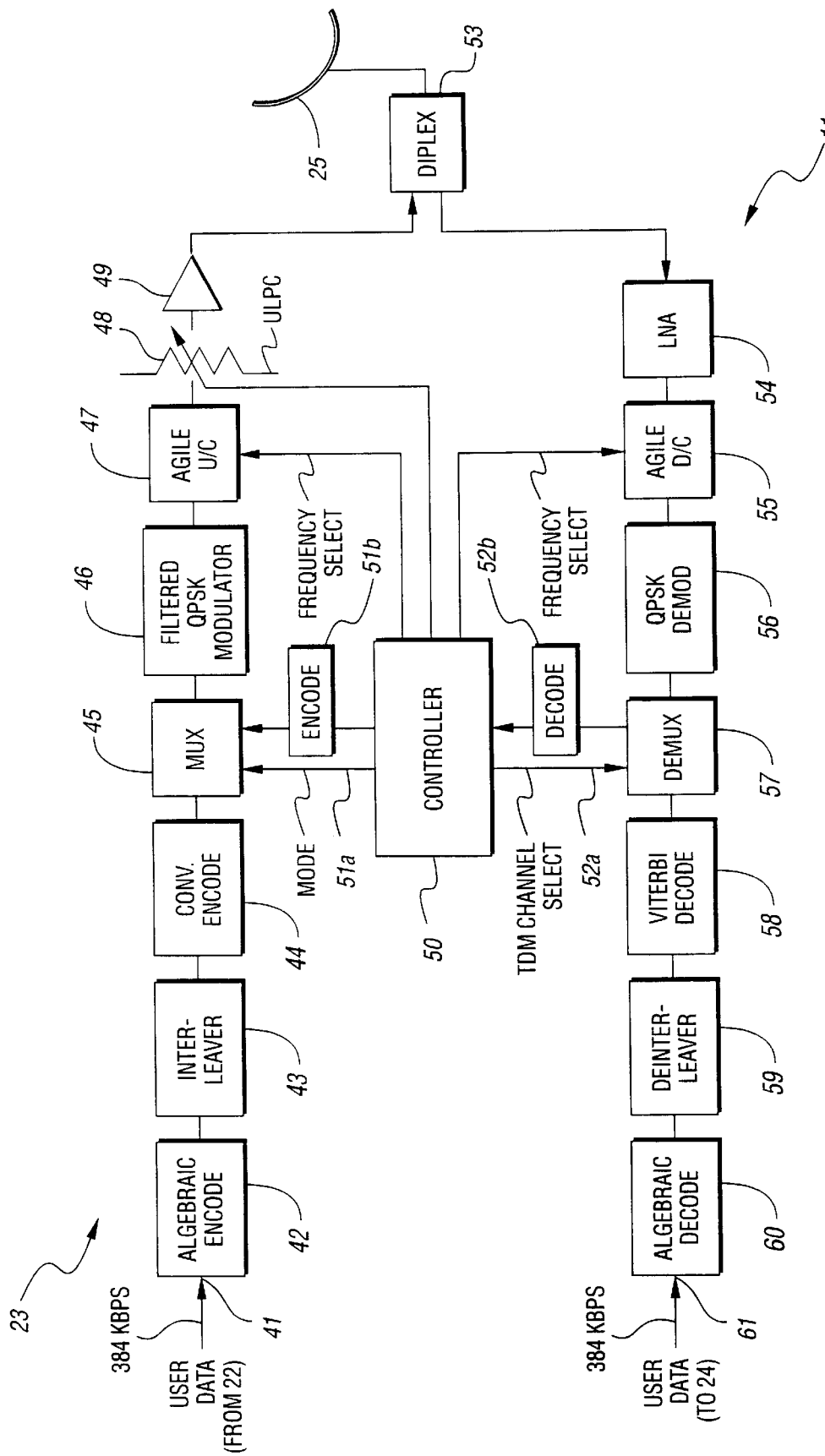
FIG. 2 is a block diagram showing a user terminal employed in the system of FIG. 1.

A more detailed description of certain components of the system 10 is provided below. FIG. 2 is a block diagram showing a user terminal 11, for example, employed in the system of FIG. 1, and in particular the details of the transceiver 23 thereof. With regard to the transmitter portion of the transceiver 23, it is comprised of a data input port 41 that receives input data, such as video and analog voice signals that have been compressed by the compression circuit 22. The components of the transceiver 23 are generally well known to those skilled in the art, and the functional blocks forming the transceiver 23 may be readily combined to implement the transceiver 23. The compressed data is input to an algebraic encoder 42, such as a Reed-Solomon (RS) or a Bose, Chadhuri, Hocquengham (BCH) encoder, and the data may be interleaved by means of an interleaver 43. The interleaved data is then convolutionally encoded in a convolutional encoder 44 whereafter it is multiplexed in a multiplexer 45 with control signals 51$a$ and encoding signals 51$b$ generated by a controller 50. The multiplexed data is processed by a filtered quadrature phase shift keyed (QPSK) modulator 46 and upconverted by an agile upconverter (U/C) 47. The upconverted data is then variably attenuated in an uplink power control circuit (ULPC) 48 and amplified by a solid state power amplifier 49. The uplink power control circuit (ULPC) 48 mitigates the effect of uplink interference, rain fade, beam roll-off, and the like. The amplified data signals are then coupled by way of a diplexer 53 to the antenna 25.

With regard to the receiver portion of the transceiver 23, it is comprised of a low noise amplifier (LNA) 54 that is coupled to an output port of the diplexer 53. An agile downconverter (D/C) 55 is coupled to the low noise amplifier 54 that downconverts received time domain modulated data and applies it to a QPSK demodulator 56. A demultiplexer 57 demultiplexes the received data and strips off time division multiplexed (TDM) channel information 52$a$ and decoding signals 52$b$ that are applied to the controller 50 to control the terminal operation including data rate, uplink frequency and downlink TDM slot selections. The demultiplexed data is then decoded in a Viterbi decoder 58 and deinterleaved in a deinterleaver 59. The deinterleaved data is then decoded in an algebraic decoder 60, such as a RS or BCH deocoder. The algebraic decoder 60 allows recovery of information about the input error rate of the decoder 60. This input error rate is an end-to-end error rate. The decoded data is then output from an output port 61 of the transceiver 23.

It is to be understood that the present invention is not limited to the above-described error correction coding circuits and modulation scheme. Clearly, other modulation and/or forward error correction schemes, such as RS or BCH codes combined with shifted QPSK (SQPSK) or binary phase shift keying (BPSK) modulation, for example, may be readily employed in the present invention.

At the user terminal 11,12 receiving the data, two measurements are available to evaluate link quality. In each case, the basic circuitry to perform these measurements is already utilized for communication purposes. The uplink power control approach of the present invention requires only that the existing circuitry be interfaced with a processor that re-formats the data and transmits it to the originating user terminal 11,12.

The downlink quality is monitored by measuring the error rate on framing synchronization data contained within the downlink data stream. The framing synchronization data are required to allow the receiving terminal 12 (assuming the user terminal 11 is the transmitting terminal) to extract the signal of interest from the time-division multiplexed downlink data stream. The framing synchronization data consists of known binary digits that are interleaved into the downlink data stream to identify the timing synchronization of the satellite's on-board multiplexer. Once synchronization is achieved, the receive terminal 12 continues to check the framing data against the known pattern to ensure synchronization has not been lost. The uplink power control approach of the present invention utilizes the measured error rate to determine the link quality. Since the framing data are generated on-board satellite 30, the measured error rate is the downlink contribution only.

The algebraic decoder 60 of the receiver terminal 12 provides the second opportunity to measure link quality. The algebraic encoding/decoding process operates on blocks of multi-bit characters. These are frequently 8-bit characters, or bytes, but other sizes may be used. Upon encoding the data, redundancy characters are added to blocks of user data characters. At the receiving end, this redundancy allows the algebraic decoder 60 to correct a limited number of character errors that occur during transmission. For example, a (255,239) RS codeword appends 16 redundancy bytes to 239 bytes of user information (note that 255=239+16). In this case, the redundancy is sufficient to allow an RS decoder to correct up to 8 byte errors anywhere in the 255 byte codeword. As a by-product of performing the decoding operation, the RS decoder must determine the number of errors that occur within the codeword. By averaging this number over many codewords, an estimate of input error probability for the RS decoder can be determined. Since the RS encoding/decoding is performed end-to-end on the link, this is a measurement of the overall link quality, i.e., uplink and downlink effects are measured.

A table look-up is utilized to relate the downlink error rate and the end-to-end error rate to the performance of the uplink of the transmitting terminal 11. The use of the table look-up is explained in conjunction with FIGS. 3 and 4.

Figure 3:
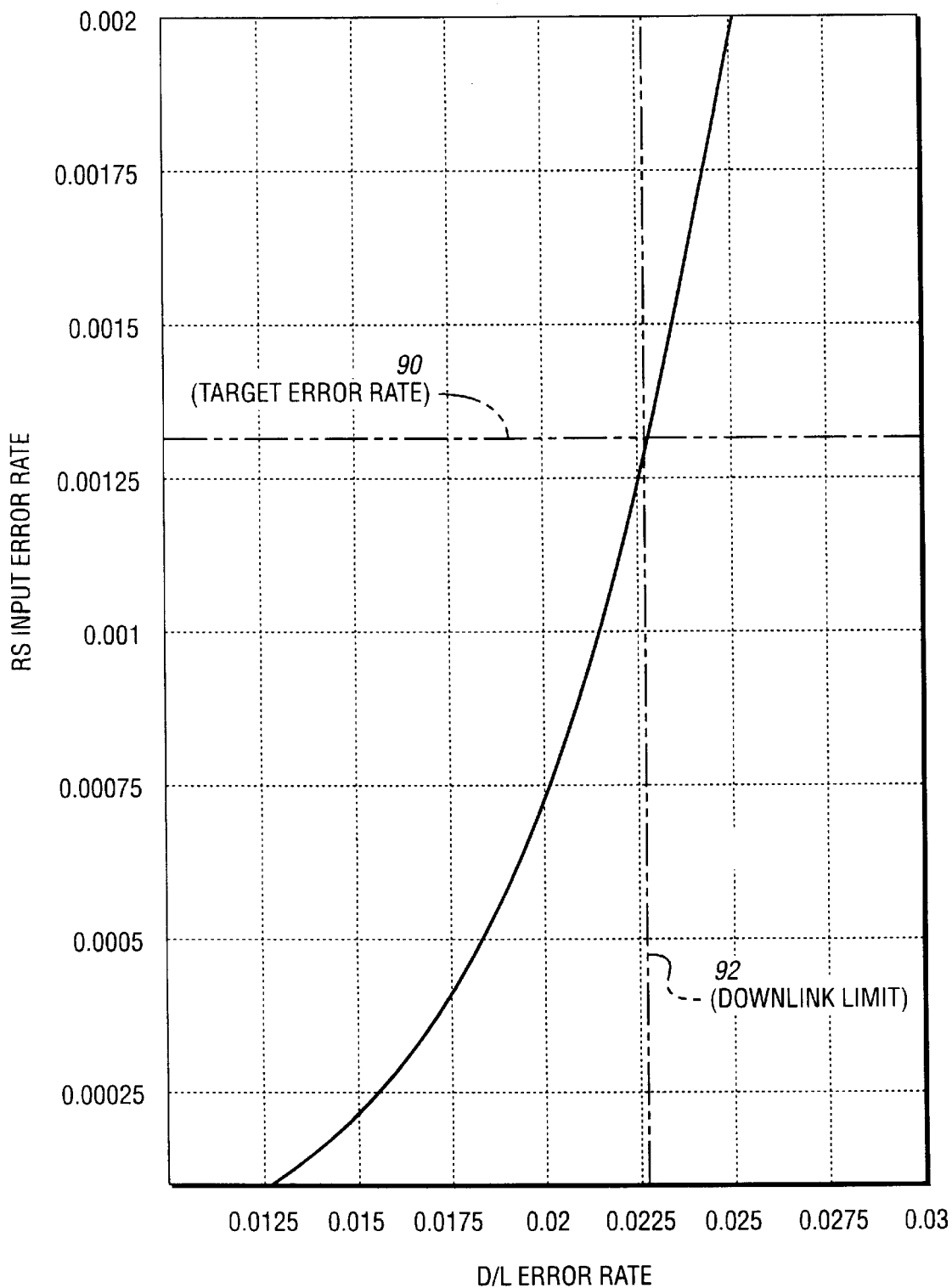
FIG. 3 is graph illustrating the relationship between a downlink error rate and an input error rate.

As illustrated in FIG. 3, the horizontal axis represents the downlink error rate, which is estimated by monitoring the framing data. The vertical axis represents the input error rate of the algebraic decoder 60, which is estimated by monitoring the decoder error-correction solutions. The plotted curve denotes the link error performance without any uplink error contributions. That is, if the uplink is error free and in the absence of measurement errors, this curve shows the correspondence between the downlink (framing data) error measurement and the input character error rate, which is the end-to-end error rate. This particular example is for a rate 4/5 convolutional inner code with soft decision Viterbi decode, but similar curves can be calculated for other code rates and types.

FIG. 3 also illustrates two important error rates. First, the horizontal line 90 end-to-end error rate of algebraic decoder 60 defines the target error rate. In this case, a character error rate of about 0.0013 results in a probability of decoder failure of one in 1010 codewords. The vertical line 92 at a downlink error rate of about 0.0227 depicts the upper limit on the allowable downlink error rate that can allow link closure, i.e., operation of the communication link at a satisfactory error rate.

A link quality measurement consists of one downlink error rate estimate and one end-to-end error rate estimate. Each measurement can be viewed as a point on the graph shown in FIG. 3. The uplink power control of the present invention depends on where the measured value falls on the graph of FIG. 3. Points to the right of the downlink limit vertical line indicate an inability to achieve link closure due to downlink noise. Repeated measurements in this region mean the link cannot be closed and the call should be terminated. Measurements beneath the curve indicate both some downlink measurement error and little contribution due to uplink. In this case, the uplink power control algorithm of the present invention takes no action.

Figure 4:
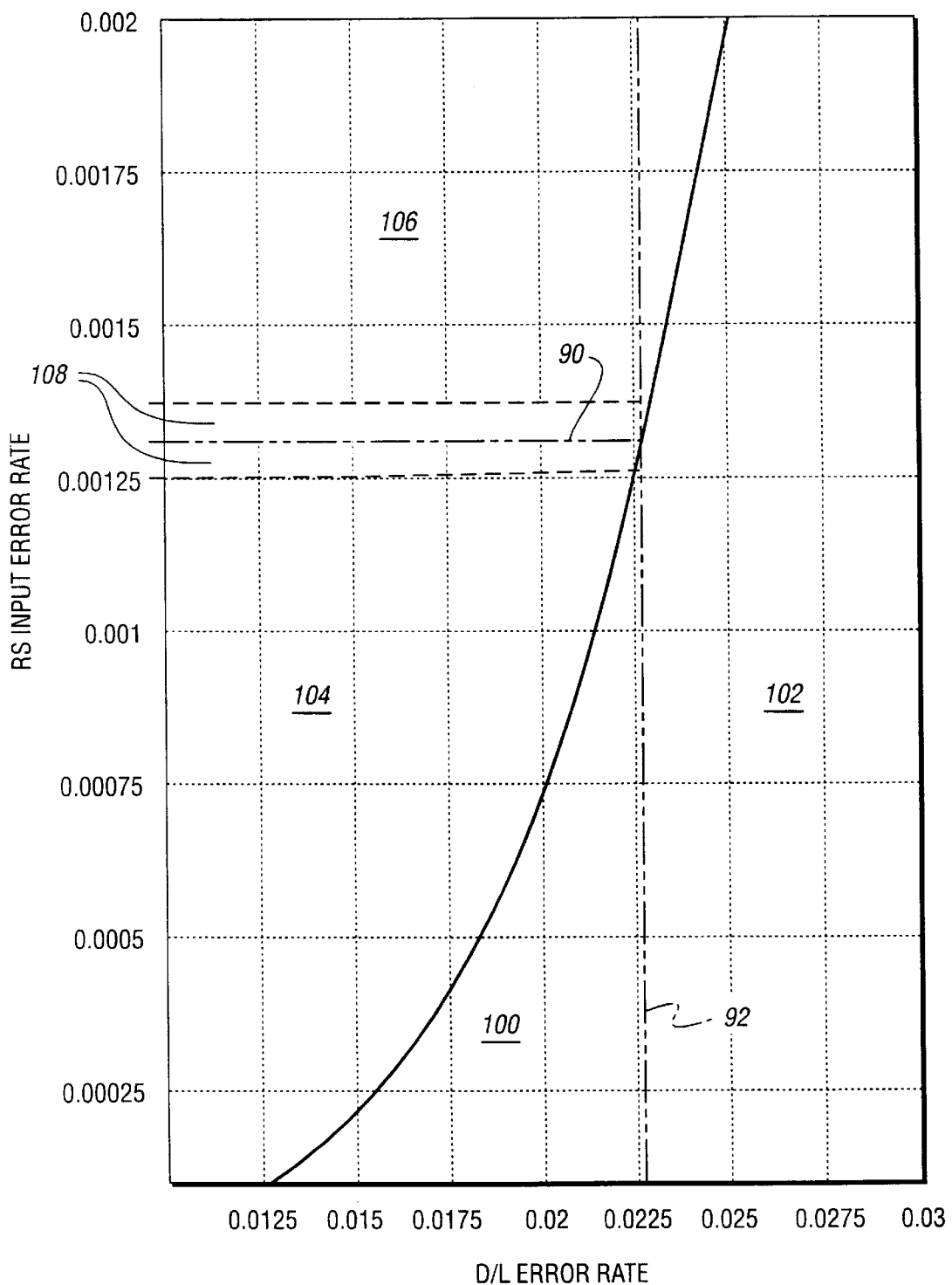
FIG. 4 is a graph illustrating the control of the uplink power based on the downlink error rate and the input error rate.

FIG. 4 maps out the uplink power control algorithm behavior for each region in the plot, including a "no action" region 100, an "abort call" region 102, a "reduce uplink power" region 104, and a "boost uplink power" region 106. As mentioned above, each measurement may actually be quite noisy, but the measurement rate is quite fast relative to the round-trip delay time. Thus, many measurements may be averaged or voted for each update of the power control loop. If the error rate is lower than required for the desired link performance, the uplink power can be reduced to avoid excessive interference with other system users. This corresponds to the "reduce uplink power" region 104. If the error rate is higher than acceptable, the uplink power will be boosted to overcome link noise and interference. This is the "boost uplink power" region 106. A "dead zone" 108 near the target error rate line is established to avoid constantly dithering the uplink signal power. Error rates that fall in the "dead zone" 108 are not acted upon.

Figure 5:
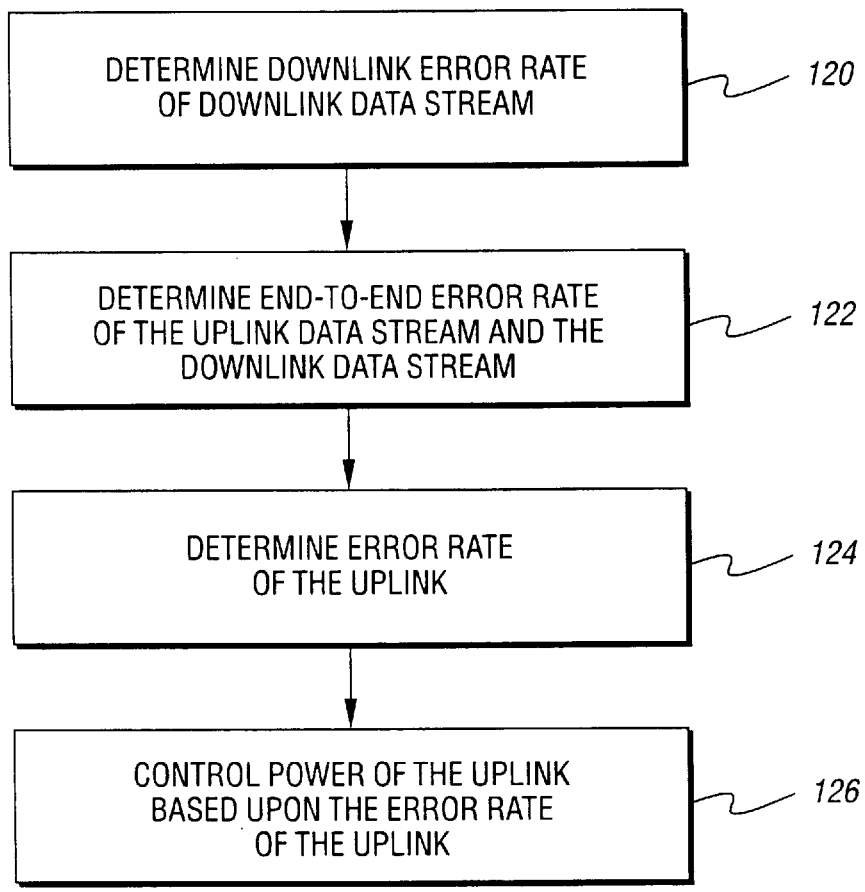
FIG. 5 is a flow diagram illustrating the general sequence of steps associated with the method of the present invention.

Turning now to FIG. 5, there is shown a flow diagram illustrating the general sequence of steps associated with the method of the present invention. The method includes the step of determining a downlink error rate of the downlink data stream, as shown at block 120. The downlink error rate is determined by counting errors which occur on predetermined data bits which have been interleaved into the downlink data stream. This is accomplished by time division multiplexing the downlink data stream. The time division multiplexed data includes framing synchronization data which is required to allow the receiving terminal 12 to extract the data from the time division multiplexed downlink data stream.

The method also includes the step of determining an end-to-end error rate of the uplink data stream and the downlink data stream, as shown at block 122. RS or BCH encoding/decoding provides the opportunity to measure the quality of the link. Blocks of the data in the uplink data stream are encoded to include redundancy characters. At the receiving end, the blocks of data are decoded to generate decoded blocks of data. Finally, a number of errors in the data is determined based on the decoded blocks of data and the redundancy characters.

An error rate of the uplink is then determined based on the downlink error rate and the end-to-end error rate, as shown at block 124. The error rate of the uplink is determined based on a predetermined lookup table identifying the relationship between the uplink power, the downlink error rate, and the end-to-end error rate. Finally, the power of the uplink is then controlled based on the error rate of the uplink, as shown at block 126.

Thus, the method and system of the present invention allow mitigation of system uplink self-interference and eliminate potential system runaway conditions by allowing the uplink to be individually controlled based on constant feedback regarding the performance of the uplink as well as the downlink. Complexity is minimal since the present invention requires only an error counting accumulator to be added to the demultiplexer function of the user terminal. Furthermore, the power control algorithm for the uplink power is modified slightly by adding a table look-up identifying the relationship of downlink error rates and end-to-end error rates with uplink performance.

While the best modes for carrying out the invention have been described in detail, those familiar with the art to which this invention relates will recognize various alternative designs and embodiments for practicing the invention as defined by the following claims.

What is claimed is:

1. A method for controlling uplink power for signal transmission in a satellite communication system employing on-board demodulation and remodulation and having a plurality of user terminals linked and communicating data by way of a satellite relay system, wherein the data is transmitted by an uplink data stream and a downlink data stream, the method comprising the steps of:

determining a downlink error rate of the downlink data stream;

determining an end-to-end error rate of the uplink data stream and the downlink data stream;

determining an error rate of the signal transmission based on the downlink error rate and the end-to-end error rate; and controlling the power of the signal transmission based on the error rate of the signal transmission.

2. The method as recited in claim 1 wherein the step of determining the downlink error rate includes the step of counting errors which occur on predetermined data bits which have been interleaved into the downlink data stream.

3. The method as recited in claim 2 wherein the step of counting includes the step of time division multiplexing the downlink data stream.

4. The method as recited in claim 3 wherein the predetermined data bits include framing synchronization data.

5. The method as recited in claim 1 wherein the step of determining the end-to-end error rate includes the steps of:

encoding blocks of the data transmitted by the uplink data stream to include redundant information;

decoding the blocks of data in the downlink data stream to generate decoded blocks of data; and determining a number of errors in the decoded blocks of data based on the redundant information.

6. The method as recited in claim 5 wherein the step of determining the number of errors includes the step of averaging the number of errors in the decoded blocks of data over a plurality of the blocks of data.

7. A system for controlling uplink power for signal transmission in a satellite communication system employing on-board demodulation and remodulation and having a plurality of user terminals linked and communicating data by way of a satellite relay system, wherein the data is transmitted by an uplink data stream and a downlink data stream, the system comprising:

means for determining a downlink error rate of the downlink data stream;

means for determining an end-to-end error rate of the uplink data stream and the downlink data stream;

means for determining an error rate of the signal transmission based on the downlink error rate and the end-to-end error rate; and a controller for controlling the power of the signal transmission based on the error rate of the signal transmission.

8. The system as recited in claim 7 wherein the means for determining the downlink error rate includes means for counting errors which occur on predetermined data bits which have been interleaved into the downlink data stream.

9. The system as recited in claim 8 wherein the means for counting includes means for time division multiplexing the downlink data stream.

10. The system as recited in claim 9 wherein the predetermined data bits include framing synchronization data.

11. The system as recited in claim 7 wherein the means for determining the end-to-end error rate comprises:

an encoder for encoding blocks of the data transmitted by the uplink data stream to include redundant information;

a decoder for decoding the blocks of data in the downlink data stream to generate decoded blocks of data; and means for determining a number of errors in the decoded blocks of data based on the redundant information.

12. The system as recited in claim 11 wherein the means for determining the number of errors includes means for averaging the number of errors in the decoded blocks of data over a plurality of the blocks of data.

\* \* \* \* \*